United States Patent
Mochizuki et al.

(10) Patent No.: US 6,453,773 B1
(45) Date of Patent: Sep. 24, 2002

(54) ELEVATION AND INDEX APPARATUS OF WATER HYDRAULIC DRIVEN TYPE

(75) Inventors: Yoshihiro Mochizuki, Kanagawa-ken (JP); Chishiro Yamashina, Kanagawa-ken (JP); Tamami Takahashi, Tokyo (JP); Shimpei Miyakawa, Kanagawa-ken (JP); JPX Mammoto, Chiba-ken (JP); Ryuji Kodama, Nagano-ken (JP)

(73) Assignees: Ebara Corporation, Tokyo (JP); Mayekawa Manufacturing Co., Ltd., Tokyo (JP)

( * ) Notice: Subject to any disclaimer, the term of this patent is extended or adjusted under 35 U.S.C. 154(b) by 9 days.

(21) Appl. No.: 09/584,078

(22) Filed: Jun. 1, 2000

(30) Foreign Application Priority Data

Jun. 2, 1999 (JP) .......................... 11-155190

(51) Int. Cl.$^7$ .......................... B23B 29/24; B23Q 3/04
(52) U.S. Cl. .......................... 74/813 C; 74/826
(58) Field of Search .............. 74/813 R–826, 74/813 C, 813 L; 269/63, 71

(56) References Cited

U.S. PATENT DOCUMENTS

| | | | | |
|---|---|---|---|---|
| 3,757,963 A | | 9/1973 | Binkley ................. 214/1 BH |
| 4,073,424 A | * | 2/1978 | Kulicke, Jr. et al. ......... 228/4.5 |
| 4,189,963 A | | 2/1980 | Sano et al. ................. 74/821 |
| 4,359,177 A | | 11/1982 | Noto La Diega ........... 222/591 |
| 4,443,928 A | * | 4/1984 | Kielma ..................... 29/568 |
| 4,444,534 A | * | 4/1984 | Bergman ................... 409/164 |
| 4,457,659 A | * | 7/1984 | Watanabe .................. 414/223 |
| 5,153,973 A | * | 10/1992 | Kitamura ................... 29/33 P |
| 5,201,249 A | * | 4/1993 | Sterenberg ................. 74/814 |
| 6,220,116 B1 | * | 4/2001 | Warner ..................... 74/813 C |
| 6,240,807 B1 | * | 6/2001 | Hebener et al. ............ 74/813 R |

FOREIGN PATENT DOCUMENTS

| | | |
|---|---|---|
| JP | 8-232904 | 9/1996 |
| WO | 95/15087 | 6/1995 |

OTHER PUBLICATIONS

Yamashina, Chishiro et al., "Development of Water Hydralic Cylinder Position Control System", Proc. $3^{rd}$, JHPS International Symposium of Fluid Power, 1996, pp. 55–60.

Takahashi, Tamami et al., "Development of Water Hydraulic Proportional Control Valve", Proc. $4^{th}$, JHPS International Symposium of Fluid Power, 1999, pp. 549–554.

Mochizuki, Yoshihiro et al., "Servo Control of a Water Hydraulic Axial Piston Motor", Proc. $5^{th}$, triennial International Symposium on Fluid Control, Measurement and Visualization, 1997, pp. 301–306.

* cited by examiner

Primary Examiner—Chong H. Kim
(74) Attorney, Agent, or Firm—Wenderoth, Lind & Ponack, L.L.P.

(57) ABSTRACT

An elevation and index apparatus of a water hydraulic driven type has a rotary table (5) supported pivotally by a cross roller bearing (15), a water hydraulic motor (9) and a water hydraulic cylinder (8), each fixed to a table base (14) supporting a power transmission mechanism and the cross roller bearing (15), a main elevation shaft (7) connected to an output shaft of the water hydraulic cylinder (8), an elevation and index table (1) connected to the main elevation shaft (7) through a bearing (7a) and connected to the rotary table (5) so as to restrict pivotal movement, and a casing (18) disposed outside the table base (14) and enclosing the power transmission mechanism.

20 Claims, 3 Drawing Sheets

ELEVATION AND INDEX APPARATUS OF WATER HYDRAULIC DRIVEN TYPE

BACKGROUND OF THE INVENTION

The present invention relates to an elevation and index apparatus of a water hydraulic driven type and, more particularly, to an elevation and index apparatus of a water hydraulic driven type having a high level of cleanliness and washability as well as high positioning accuracy and a high responsiveness. The elevation and index apparatus of a water hydraulic driven type is particularly useful for food processing machines.

(Related Art)

Hitherto, as an index table of a machine tool, there has been used an elevation and index mechanism having an elevation table and a rotary table. The elevation table has a piston disposed so as to move upwardly or downwardly by a cylinder mechanism while restricting its rotary movement about its axis. The rotary table is supported on the elevation table so as to pivot about the axis.

Relating to a mechanism for positioning a rotary table by driving and rotating the table held rotatably through a gear reduction mechanism by a servo-motor, proposed was a mechanism which can reduce a positioning error resulting from a backlash of the gears by using a mechanism biasing the table in either rotary direction at the positioning period after driving the rotary table.

A roller gear cam mechanism has been known for long time, and is sold as a single part, for example, under the trade name "INDEX DRIVE".

On the other hand, a so-called water hydraulic component has been developed from the point of view of cleanliness, safety, saving resources and the other purposes, which uses clean water, in place of oil that has been used as a working medium for conventional oil hydraulic components. The water hydraulic component is basically the same as the conventional oil hydraulic component using oil as the working medium, in that the water hydraulic component using water as the working medium utilizes the pressure of a fluid. Therefore, the former is almost the same as the latter in terms of operation principles and structural configuration. Since water has problems in that its lubricating properties are lower than oil and it is prone to cause rust, structures and materials are devised for the water hydraulic components using water as the working medium so as to overcome these problems.

In the current food processing industry, a large number of works are conducted manually because of the fact that objects to be processed, such as meat, agricultural products, etc. vary substantially in size, shape, etc. depending on individuals. Automation of the food processing has strongly been demanded because reducing manual work is more effective and useful from the point of view of prevention of contamination with bacteria such as Escherichia coli, etc., saving of labor, and for other reasons.

For such machines for use in automation of processing food, an accurate positioning of objects to be processed is demanded to adjust the individual differences of the processed objects, in order to improve the quality and yield of the products by the automated processing of the objects on the basis of measurements for shapes of the individual objects and results of the measurements. In particular, a so-called base machine by which the objects to be processed by a food processor are measured and transferred to the processing location is required to satisfy many requirements from the point of view of productivity, such as high-speed processing ability, improved speed, compactness, etc., in addition to an accurate positioning performance. Moreover, as machines for processing fob are required to allow its food-processing section to be washed by spraying water under high pressure, the base machine is also required to have high resistance to washing.

As devices for driving and controlling the base machine, there have hitherto been extensively used components that can be driven electrically or hydraulically. However, considering a washing by high-pressure water for electrically driven components, in order to prevent danger of electric leakage of failures due to water penetration into electric components such as a cylinder or a motor (hereinafter referred to as "an actuator") for generating a large power, it is required to enclose the periphery of the actuator so as to seal it against water penetration. Therefore, enclosing of the electrical components may result in a larger size of the entire system, or require air purging in accordance with the sealing conditions and, additional accessory instruments are occasionally needed.

Moreover, the enclosing of the electrical devices may cause problems due to poor heat radiation or dissolving of the grease caused by heating up of the actuators. Further, it may require a connecting mechanism in order to extract an output through the sealed portion, or it may result in a decrease in output. On the other hand, the oil hydraulic components have the lesser risk of causing failures due to washing of the apparatus, and can even realize a higher output and responsiveness than the electrically drivable devices. However, if standard materials are used for the hydraulic components, there is a risk that rust is produced due to exposure to washing water, or that the surroundings are contaminated with oil that is leaked from the inside of the components. Furthermore, oil available for use with food processing machines can be used as operating oil for the components; however, such oil cannot be said to be thoroughly non-toxic and non-hazardous to the environment and the human body.

In addition, there may also be used a pneumatically driven component that is recognized as a clean drive system, although it is little used for a base machine. Such a pneumatic driven component; however, may suffer from difficulties in that a high power cannot be produced as compared to that produced by using hydraulic driven components and electric driven components. Also, it is anticipated that it is difficult to achieve desired high positioning accuracy due to the lack of rigidity resulting from compressibility of air. Furthermore, a problem might result from discharging of lubricant oil from the components, and the compressor for generating air pressure, in the form of oil mist. Given those problems, a pneumatic driven component is not suitable for use in food processing machines.

SUMMARY OF THE INVENTION

Problems to be Solved by the Invention

In order to solve the problems prevailing in the conventional food processing devices, extensive studies have been made regarding elevation and index apparatuses for use particularly with a base machine of a food-processing machine. As a result of extensive studies, it was found that an elevation and index apparatus of a water hydraulic driven type having a particular compact structural configuration could achieve desired machine performance.

Means to Solve the Problems

Therefore, the present invention has the object to provide an elevation and index apparatus of a water hydraulic driven type having a compact structural configuration as well as a high level of cleanliness, washability, responsiveness, output and positioning accuracy, which can be used in a transfer-load section that is used as a base machine particularly for a food processing machine.

In order to achieve the object, the present invention provides an elevation and index apparatus for loading an object to be processed, and transferring and locating the loaded processing object by moving upwardly or downwardly and indexing the loaded processing object. The elevation and index apparatus is of a water hydraulic driven type consisting of a rotary table supported pivotally by a bearing, a power transmission mechanism composed of a follower node fixed to the rotary table and a drive node engaged with the follower node, a motor that has an output shaft thereof connected to the power transmission mechanism and that is fixed to a table base supporting the bearing, a cylinder disposed so as to move linearly along the pivotal center of the follower node fixed to the table base, a main elevation shaft extending through a communicating bore formed in the center of the rotary table connected to an output shaft of the cylinder, an elevation and index table connected to the rotary table connected to the main elevation shaft through a bearing so as to move upwardly or downwardly while restricting its pivotal movement, and a casing disposed outside the table base and enclosing the power transmission mechanism, wherein the motor and the cylinder are each of a water hydraulic driven type, and the motor and the cylinder are each controlled by a hydraulic control valve.

With the configuration as described above, the elevation and index apparatus of a water hydraulic driven type according to the present invention can be a compact mechanism with larger elevating and lowering strokes, as compared with an elevation and index apparatus of a configuration with a rotary table disposed on an elevation table. This is so because, the communicating bore is formed in the center of the rotary table and the main elevation shaft extends entirely through the communicating bore to support the elevation and index table disposed over the rotary table. Furthermore, the driving of the rotary table is controlled by the water hydraulic cylinder and motor as well as the water hydraulic control valve, so that there is no risk that the surroundings are polluted and short circuiting results due to leakage of a driving medium.

Moreover, because a water hydraulic actuator is made of a rustproof material, it is not necessary to take into account failures to be caused by water and rust, and to make the configuration of the component protective from washing water. Therefore, the use of water hydraulic components can provide a higher freedom of configuration for the apparatus, thereby readily producing a compact apparatus. In addition, as the water hydraulic actuator is driven by liquid pressure, like the oil hydraulic actuator, it can realize output and responsiveness as high as the oil hydraulic actuator.

Furthermore, the apparatus according to the present invention has the casing disposed so as to enclose the power transmission mechanism, so that the mechanism portion requiring lubrication is not sprayed directly with washing water, thereby improving speed and reliability of the apparatus. In addition, even if water would somewhat penetrate into the inside of the casing, the enclosed mechanism is composed mainly of simple mechanical parts so that the occurrence of significant failures and the shortening of a life time of the device can be prevented.

According to another aspect of the present invention, the elevation and index apparatus of a water hydraulic driven type is preferably provided with a biasing mechanism that is disposed so as to rotate the rotary table in either direction with a force somewhat smaller than the driving force of the motor by using a reduction gear mechanism as the power transmission mechanism, when the rotary table is located in the vicinity of a predetermined indexing position.

When the reduction gear mechanism composed of a combination of gears is used as the power transmission mechanism in the above manner, the apparatus driven by the reduction device can be made smaller in size and the capacity of the driving motor can be reduced. Further, the elevation and index table can be positioned to desired accuracy even if the motor is positioned with comparably lower accuracy. In this instance, even if a water hydraulic motor, for example, would be positioned at a predetermined position, the elevation and index table may be caused to deviate to a slight extent by a working reaction force due to a backlash of the gears, or an error would be caused to occur in the positioning of the is elevation and index table due to such a backlash. Providing the rotary table with a biasing force and rotating the rotary table slightly by means of the biasing force, however, can control impacts of the backlash.

According to a further aspect of the present invention, the elevation and index apparatus of a water hydraulic driven type is preferably provided with a water hydraulic driven motor integrated with a reduction device of a water lubrication type and a built-in sensor, and a water hydraulic cylinder with a built-in sensor.

A sensor has the risk that it causes failures due to contact with washing water permeating into the device, or to a physical force such as impact, etc. upon spraying with washing water. In this embodiment, the sensor is built in the water hydraulic motor and the water hydraulic cylinder, so that the sensor does not undergo the impact resulting from the direct spraying of washing water. Therefore, the apparatus according to the present invention can reduce the occasions of causing failures due to the washing of the motor and the cylinder, thereby achieving improvements in the reliability of the power transmission mechanism as a whole.

According to a still further aspect, the present invention is preferably directed to the elevation and index apparatus of a water hydraulic driven type having a rotary position sensor installed inside the casing, which senses the rotary position of the rotary table.

With this configuration of the apparatus, an absolute position of the rotary table can be detected, which is needed for the alignment with a processing tool, and an actual position of the rotary table can be detected without undergoing the influences of a backlash resulting from the reduction mechanism. In this configuration, it is preferred that a sensor for use in detecting the position of the table is disposed inside the casing because this configuration does not require the sensor to be protected by special waterproof treatment procedures.

According to a still further aspect, the present invention is preferably directed to the elevation and index apparatus of a water hydraulic driven type having a control unit that is so adapted as to-control the motor following a target pass pre-computed on the basis of a sensor signal from the sensor built in the motor at the point of time of starting the positioning of the rotary table, and then shifted to control the motor on the basis of a signal from the rotary position sensor at the point of time when the target pass reaches a target position.

A sensor having high precision is required if the motor is controlled only by the sensor mounted on the rotary table side. However, as in the still further embodiment of the present invention, wherein the two sensors are to be shifted so as to comply with the conditions, the motor can be controlled with high accuracy even if the sensors are not so high in precision.

Further, according to another aspect, the elevation and index apparatus of a water hydraulic driven type is preferably provided with the power transmission mechanism consisting of a combination of a concave globoidal cam with a roller cam follower.

The use of a combination of the concave globoidal cam with the roller cam follower as the power transmission mechanism can realize a high indexing accuracy even if the positioning accuracy of the motor is lower than the case where the reduction gear mechanism is used as the power transmission mechanism and the biasing mechanism is used in the manner as described above. This configuration rarely causes a backlash; however, it entails the loss of space to some extent.

According to a still further aspect, the present invention is preferably directed to the elevation and index apparatus of a water hydraulic driven type which uses a water hydraulic driven motor integral with a reduction device of a water lubrication type as the motor, and a water hydraulic driven cylinder with a built-in mechanism decelerating at the terminal end of the stroke is used as the cylinder.

By using a water hydraulic motor with the reduction device built therein, since positioning accuracy of the motor can be a low level that does not require a sensor with high precision, and the cylinder can be operated simply to abut with the terminal end, it is possible to obtain a desirable level of accuracy by a simple ON-OFF operation of the water hydraulic control valve.

The other objects, features and advantages of the present invention will become apparent in the course of the following description with reference to the accompanying drawings.

In the drawings, reference signs mean as follows.

1: elevation and index table, 2: work-mounting jig, 3: processing tool, 4: frame, 5: rotary table, 6: slidable bearing, 7: main elevation shaft, 8: water hydraulic cylinder, 9: water hydraulic motor, 10: manifold block, 11: water hydraulic servo-valve, 12: water hydraulic shut-off valve, 13: cover, 14: table base, 15: cross roller bearing, 16: inner toothed gear, 17: outer toothed gear, 18: casing, 19: roller-equipped slide table (a biasing mechanism), 20: oil seal, 21: oil seal, 22: magnetic drum, 23: rotary position sensor, 24: control instrument-accommodating section, 25: shift instructing section, 26: target pass generating section, 27: target point table, 28: convergence deciding section, 29:motor sensor, 30: control unit, 31: comparing section, 32: comparing section, 33: gain A,. 34: gain B, 39: water hydraulic cylinder sensor, 40: water hydraulic cylinder, 41: water hydraulic motor, 42: water hydraulic directional control valve, 43: water hydraulic throttle valve, 44: bevel gear, 45: roller gear cam, 46: limit switch, 47: roller follower, 91; reduction mechanism, SW1: shift switch, SW2: shift switch, D: requirement for indexing, E: completion of indexing, G: start-up signal, H: position signal, K: target speed value, M: target speed input, N: detected speed, J: target pass.

DETAILED DESCRIPTION OF THE PREFERRED EMBODIMENTS

Figure 1:
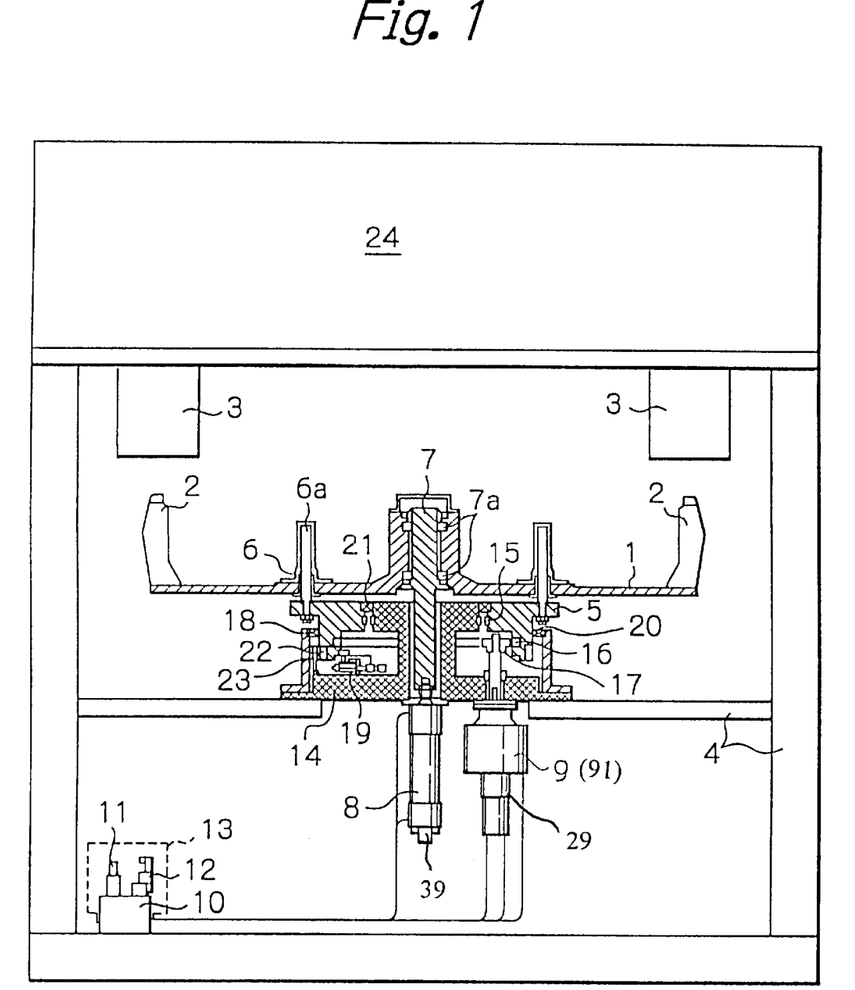
FIG. 1 is a diagram showing an example of the configuration of an automated meat processor equipped with an elevation and index apparatus of a water hydraulic driven type according to the present invention.

The present invention will be described in more detail by way of embodiments with reference to the accompanying drawings. FIG. 1 shows an example of the configuration of an automated meat processor equipped with a water hydraulic driven elevation and index apparatus according to the present invention. In FIG. 1, reference numeral 1 represents an elevation and index table. On the elevation and index table 1 are disposed work mounting jigs 2 in an equally spaced relationship, and meat as an object to be processed is supplied from a predetermined location (a supply port) of the apparatus and loaded thereon while elevating the elevation and index table 1.

As meat is loaded on the apparatus, the elevation and index table 1 is lowered in order to avoid interference with a processing tool 3, and it is indexed at a defined angle to transfer the meat to a position for a next processing step. At the position of the next processing step, the table is elevated to transfer the meat to a processing region of the processing tool 3 mounted on a frame 4 for processing the meat. After the processing of the meat has been finished, the elevation and index table 1 is lowered again to be indexed for transferring an object to be next processed to a position for a following processing step.

By repeating this cycle, the processing is carried out by means of the processing tool 3 specialized for each of the processing steps (e.g., cutting step, skin-removing step, etc.). The processed object is discharged automatically at a downstream indexing position via a supply port. Between these processing steps, a measuring step is provided to comply with a difference of individual objects, i.e., meat, and a deviation of the location of the meat loaded on the table. During the measuring step, the feature of the shape of the meat is detected by a sensor and is utilized in performing work at the next step. Therefore, it is required to position the work mounting jigs 2 along the circumference of the elevation and index table 1 such that the central position of the work-mounting jigs 2 are located within an acceptable accuracy range required for processing. This can be applied to the positioning of the top end of the work-mounting jig 2 when it is elevated or lowered.

The elevation and index table 1 is connected to a rotary table 5 via slidable bearings 6 disposed on the elevation and index table 1 in an equally spaced relationship, and via slidable shafts 6a held on the slidable bearings 6 and fixed to the rotary table 5 so as to be movable upwardly and downwardly. With this configuration, the elevation and index table 1 can be rotated integrally with the rotary table 5 and at the same time be moved in upward and downward directions. The elevation and index table 1 is held by a pair of bearings 7a disposed at a top portion of a main elevation shaft 7, and the main elevation shaft 7 is connected to an output shaft of a water hydraulic cylinder 8. The rotary positioning of the elevation and index table 1 is controlled by the positioning of the water hydraulic motor 9 driving the rotary table 5, and the vertical positioning thereof is controlled by the positioning of the water hydraulic cylinder 8, separately and independently from the positioning of the water hydraulic motor 9.

The water hydraulic cylinder 8 and the water hydraulic motor 9 are each driven by controlling a water hydraulic servo-valve 11 mounted on a manifold block 10, by means of the supply and discharge of water to and from a high-pressure water supply device (not shown). The manifold block 10 is also provided with a water hydraulic shut-off valve 12 that can stop the supply or discharge of water upon turning power off, or in case of an emergency suspend the operation of the water hydraulic cylinder 8 and the water hydraulic motor 9. The manifold block 10 is covered with a cover 13 having a simple configuration to prevent occurrence of failures of the water hydraulic servo valve 11 and the water hydraulic shut-off valve 12 due to being contacted with sprayed water during the time of washing of the apparatus.

The rotary table 5 is rotatably held by a cross roller bearing 15 mounted on a table base 14 and fixed to an inner toothed gear 16 that in turn is engaged with an outer toothed gear 17 connected to an output shaft of the water hydraulic motor 9. The water hydraulic motor 9 for use in this embodiment is a water hydraulic motor provided integrally with a reduction device of a water lubrication type and a built-in sensor. The gear mechanism is not restricted to a combination of the inner-toothed gear 16 with the outer-toothed gear 17, and may include a combination of outer-toothed bevel gears or a combination of a worm wheel with a worm for example.

The inner peripheral side of the rotary table 5 within the casing 18 is provided with a generally semi-circular depression corresponding to a predetermined index angle on its periphery. The semi-circular depression is provided with a roller-equipped slide table 19 biased with a spring toward the direction of engagement of a roller, when the rotary table 5 is located in the predetermined indexing position. The roller-equipped slide table 19 and the spring form a biasing mechanism which provides a biasing force for rotating the rotary table 5 in either direction by means of a force somewhat smaller than the driving force of the motor 9 when the rotary table is located in vicinity of a predetermined indexing position. The biasing force is adjusted so as to rotate the rotary table 5 to some extent and also to become smaller than the driving force of the water hydraulic motor 9. With this configuration, an increase in an alignment error resulting from a backlash of the reduction gear or a deviation of the elevation and index apparatus of a water hydraulic driven type caused by the reaction force upon processing can be controlled.

The interconnections between the casing 18 and the rotary table 5, and between the table base 14 and the rotary table 5 are sealed by oil seals 20 and 21, respectively, in order to prevent water from penetrating into the casing 18 upon washing of the apparatus with washing water. The water hydraulic motor 9 integral with the reduction device 91 of a water lubrication type, and the sensor 29 as well as the water hydraulic cylinder 8 with a built-in sensor 39, are each disposed outside the casing 18 at the lower portion of the table base 14.

On the outer periphery of the rotary table 5 inside the casing 18 is fixed a magnetic drum 22 with magnetic scales recorded at fine pitches thereon. The position of the rotary table 5 is detected in a non-contact manner on the basis of a variation of magnetization by a rotary position sensor 23 utilizing a magnetic resistance element fixed on the table base 14.

It is required from the point of view of productivity that the time required for elevating, lowering and indexing the elevation and index table 1 is as short as possible. On the other hand, the dimension of the elevation and index table 1 is determined by the size of the object, such as meat, the dimension of the processing tool 3, and the number of processing steps, so that the inertia moment and the weight of the elevation and index table 1 become larger as the elevation and index table 1 becomes larger in dimension. In order to meet the requirements, the base machine is required to have a high output and a high response. It is further preferred from a structural point of view that the dimension of the elevation and index mechanism is as compact as possible because the actual processing of food is effected by the processing tool 3 disposed above the elevation and index table 1.

As the processing work is being carried out by the processing tool 3 above the elevation and index table 1, meat pieces and remainders are scattered and caused to attach to the work-mounting jig 2 and the processing tool 3. Therefore, it is preferred from a sanitary point of view that washing has to be done frequently. During the washing, not only the elevation and index table 1 but the frame 4 and the floor are caused to be exposed to water containing meat and fat pieces, so that these parts have to be washed with washing water. At this time, the elevation and index mechanism section may become wet with the washing water, so that the mechanism section is also required to have high washability.

Given the foregoing explanation, the mechanism for driving the elevation and index table 1 and the rotary table 5 is required to have high precision and output, to be drivable at a high speed, and to be superior in washability as well as compact in size.

In the embodiment of the present invention, the requirements for high output and high precision can be met by utilizing a reduction mechanism for the index section. If the reduction ratio is set to become very large, this may somewhat cause a problem with a high-speed performance. This problem, however, can be dealt with by using a motor suitable for operation at a high speed, and setting the reduction ratio to reach an appropriate value. On the other hand, the elevation section is driven directly by the water hydraulic cylinder 8, so that the position control of the water hydraulic cylinder 8 at a high speed and high precision can be realized relatively easily by using a sensor having appropriate precision and a water hydraulic servo-valve 11. Furthermore, the water hydraulic cylinder 8 has a higher output compared to its size so that it can be made more compact than when converting rotary movement into a linear movement using a combination of an electric motor and a ball screw or the like is performed.

By using a usual oil-lubricating reduction device and sensor at the connecting portions of the water hydraulic motor 9 and the water hydraulic cylinder 8, only a water hydraulic motor and a water hydraulic cylinder, each being non-integral with the above sensor and reduction device, may be disposed outside the casing 18. If the sensor and the reduction device are accommodated within the casing 18, they have to be detached from the casing 18 and disassembled upon maintenance. In order to allow them to be detached from the casing 18, the processing tool 3 mounted on the upper portion of the casing 18 has to be first detached from the casing 18. After completion of maintenance, the processing tool 3 is assembled again with the casing 18, and the sensor and the reduction device are mounted again on the casing 18. Therefore, the number of parts and devices to be mounted on the casing 18 is preferably as small as possible, in order to reduce the amount of work and the duration of time required for suspension of the work upon maintenance. This is also of significance from a productivity point of view.

For the apparatus according to the present invention, the major parts including, for example, the water hydraulic actuator and the water hydraulic control valve as well as pipes and the manifold block 10 cause no problems with regard to washability even if they are exposed to washing water, because they are made of rust-proofmaterials. The mechanism parts to be accommodated in the casing 18 are lubricated with grease suitable for food machinery, so that there is no risk that the environment of producing food is polluted or contaminated with hazardous materials. Furthermore, the mechanism parts accommodated in the casing 18 are sealed by the oil seals 20 and 21, so that they are not exposed to washing water. Therefore, it is not necessary to basically take the problem resulting from direct exposure to washing water into account. Moreover, electrical parts including a sensor amplifier for controlling the elevation and index apparatus of a water hydraulic driven type, a drive amplifier of the water hydraulic control valve, a controller generating control signals, and so on are accommodated in a control instrument accommodating section 24 disposed above the frame 4, so that there is no risk that they are exposed directly to washing water.

As described above, the elevation and index apparatus of a water hydraulic driven type having the configuration as shown in FIG. 1 exhibits advantage of the features and merits, as well as the mechanical considerations of the water hydraulic system, so that the apparatus can meet the requirements as a base machine for an automated food processing machine.

Figure 2:
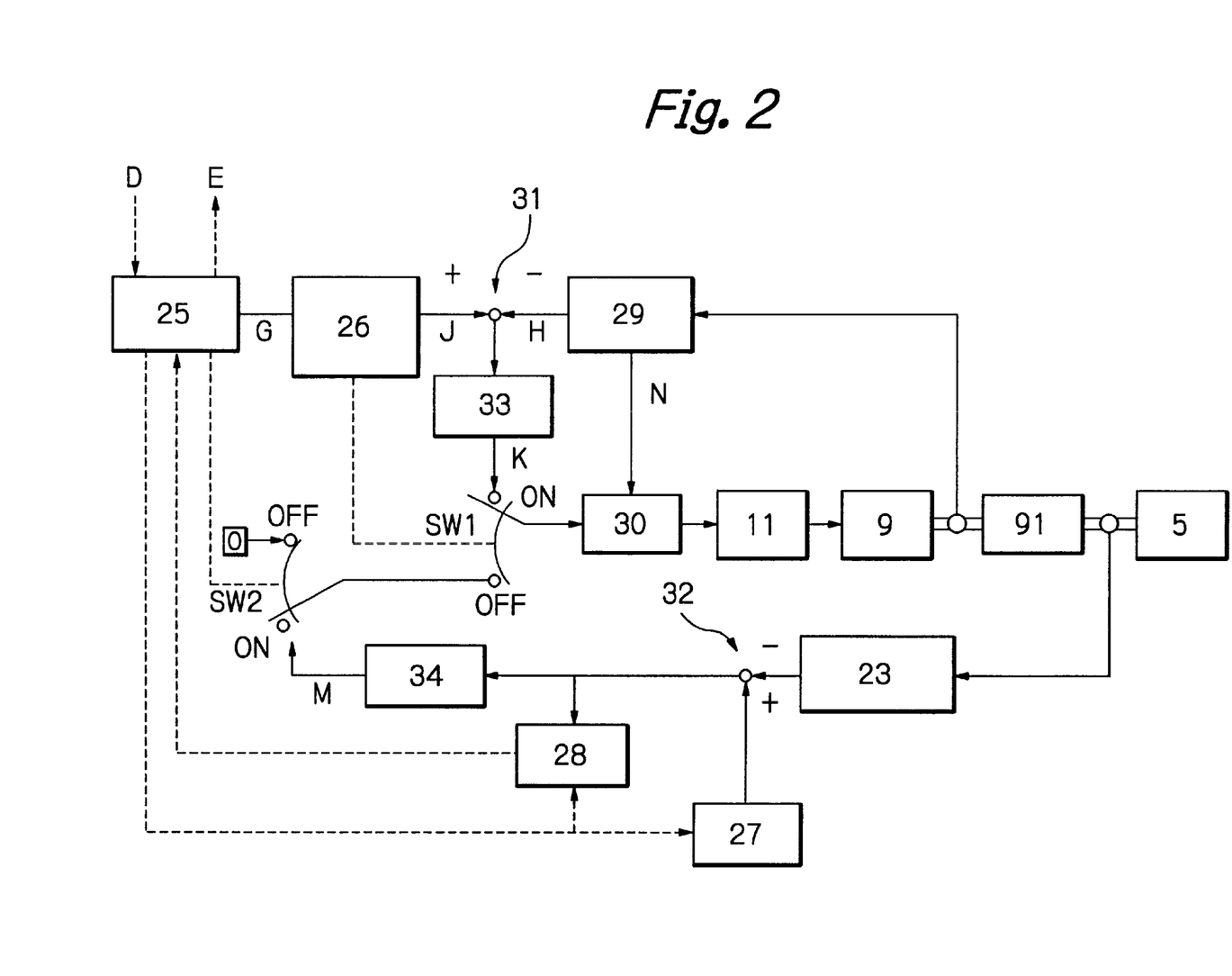
FIG. 2 is a diagram showing an example of circuit configuration of a control system of the elevation and index apparatus of a water hydraulic driven type according to the present invention.

FIG. 2 shows an example of the circuit configuration of a control system of the elevation and index apparatus of a water hydraulic driven type according to the present invention. In FIG. 2, the same elements as those shown in FIG. 1 are provided with the same reference numerals and a duplicate description of the same elements will be omitted from the description that follows. The control system consists of a shift-instructing section 25 for controlling the timing of a shift of the control, a target pass generating section 26 for creating a target pass for use during the following control, a target point table 27 set in advance from the target position of the rotary table 5, a convergence deciding section 28, a shift switch SW1, a shift switch SW2, and so on. The broken line as shown in FIG. 2 indicates a flow of signals indicating the timing of the shift, and the solid line indicates a flow of physical signals.

The water hydraulic motor 9 is controlled so as to follow the target speed to the control unit 30 by a minor feedback of the speed N detected by a motor sensor 29 built in the water hydraulic motor 9. First, a requirement D for indexing is provided from the outside, the shift instructing section 25 provides a start-up signal G to the target pass generating section 26, and at the same time shifts the shift switch SW2 to the ON side. Then, the convergence deciding section 28 is initialized to renew an index of the target point table 27 so as to indicate the next target position.

Upon receipt of the start-up signal G, the target pass generating section 26 starts creating an S-shaped target pass J that reaches a predetermined index position within a predetermined duration of time, and at the same time shifts the shift switch SW1 to the ON side. The target pass J created by the target pass generating section 26 is compared with the position signal H of the motor sensor 29, integrally built in the water hydraulic motor 9, by means of a comparison signal 31. The value obtained by multiplying the resulting difference by a gain A 33 is inputted to the control unit 30 as a target speed value K to control the water hydraulic motor 9 via the water hydraulic servo-valve 11 so as to follow the target pass J.

The target pass generating section 26 is automatically operated to shift the shift switch SW1 to the OFF side as the target pass J has reached a predetermined index position. Upon the shift of the shift switch SW1 to the OFF side, the control is shifted from the side of following the target pass to the side of controlling a constant value for the value of the target point table 27. The target point table 27 contains a target value of the position of the rotary table 5, which is compared with the output signal from the rotary position sensor 23 of the rotary table 5 by means of the comparison section 32. The value obtained by multiplying the result of comparison with a gain B 34 is then supplied to the control unit 30 as a target speed input M in order to appropriately adjust the gain A 33 and the gain B 34 such that a deviation amount (i.e., the target speed input to the control unit 30) is not changed rapidly by a difference of precision of the two sensors, i.e., the motor sensor 29 and the rotary position sensor 23, at the time of the shift.

Simultaneously, the difference between the value of the target point table 27 and the value of the rotary position sensor 23 is inputted into the convergence deciding section 28, and the completion of convergence is notified to the shift-instructing section 25 as the difference has been converged to a defined level of accuracy. The shift-instructing section 25 then shifts the shift switch SW2 to the OFF side and at the same time sends to an external system a notice of completion of indexing E.

The system, in which the two sensors, i.e., the motor sensor 29 and the rotary position sensor 23, are shifted relative to each other, can provide advantages over a system where only one sensor is used, as will be described hereinafter.

First, if accurate control is to be effected only by the motor sensor 29 built in the water hydraulic motor 9, a system is required which can correct a positioning error resulting from a backlash of the reduction mechanism 91. For instance, there may be proposed a system comprising conducting a positioning-of the rotary position, measuring an amount of the error, and providing in advance the target pass with the error taken into account. However, the adjustment has to be made by trial and error because the backlash deviates in an actual situation.

Further, if the accurate control is to be effected only by the rotary position sensor 23 fixed to the rotary table 5, a stable control becomes difficult if precision of the sensor would not be high enough, because the target pass and the detected signal each become a stepwise signal. Therefore, generally, it is said to be desired that the precision of a sensor necessary for continuous pass or the like becomes one twentieth or smaller than the target positioning accuracy.

Moreover, in the case where a speed signal is created by differentiating the signal indicative of the position detected by the rotary position sensor 23 in order to control the speed of the water hydraulic motor, a smooth speed signal cannot be obtained if a sensor of low precision is used, and stability of a control system may cause deterioration. For these reasons, in this case, a sensor with a considerably high precision is required, and it becomes difficult to prepare a sensor with such high precision having a large size like the outer periphery of the rotary table.

On the other hand, when the water hydraulic motor 9 is activated or the speed direction is changed, there may be the occasion that the movement of the water hydraulic motor does not completely synchronize with the movement of the rotary table 5 due to a non-engaged state, i.e., a clearance, between the teeth of the gears resulting from the backlash of the reduction mechanism 91. Therefore, there may be occasion that a stable limit cycle in which a non-engaged state and an engaged state recurs, or becomes instable. In order to prevent such an occurrence, it is effective to reduce a resolution of the sensor or make a control gain smaller. In this situation, however, the ability of following the passage as described above causes deterioration and this deterioration may result in difficulty of achieving an appropriate level of accuracy of controlling the positioning at a terminal end point.

In this embodiment of the present invention, the precision of the motor sensor 29 integral with the water hydraulic motor 9 is set to be relatively low because the rotation of the water hydraulic motor 9 is reduced and then transmitted to the rotary table 5. Therefore, the motor sensor can be prepared readily. Moreover, the rotary position sensor 23 mounted on the rotary table 5 can itself be used practically as long as it has a degree of precision that is about one fifth of the necessary positioning accuracy. Therefore, this can be realized easily and results in reduced manufacturing costs.

Figure 3A:
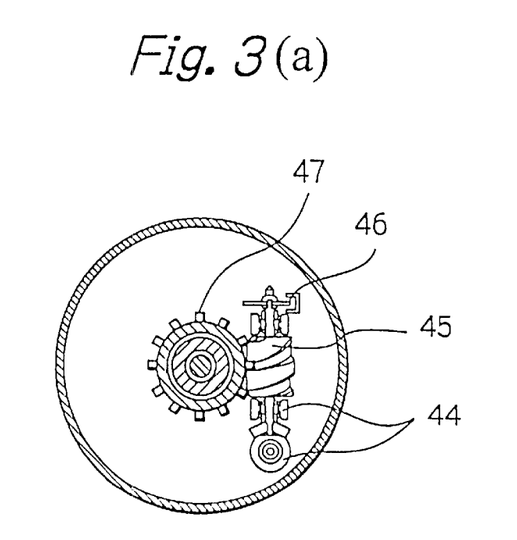
FIGS. 3(a) and 3(b) are diagrams showing an example of the configuration of the elevation and index apparatus of a water hydraulic driven type according to t he present invention.
Figure 3B:
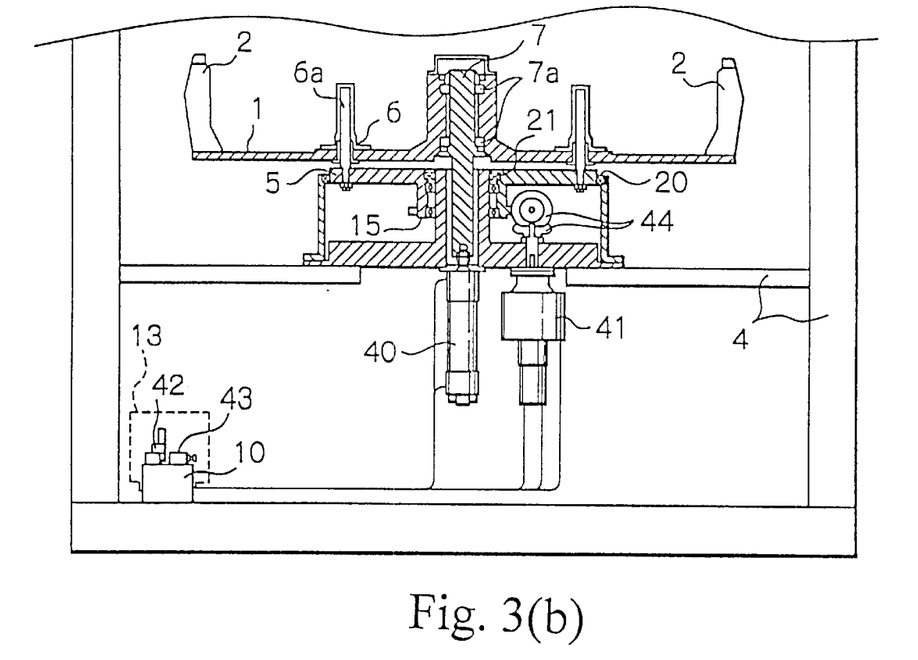

FIGS. 3(a) and 3(b) shown another example of the configuration of the elevation and index apparatus of a water hydraulic driven type of the present invention; FIG. 3(a) is a longitudinal sectional view and FIG. 3(b) is a plan view of the power transmission mechanism. The basic structural configuration of the. elevation and index mechanism of this elevation and index apparatus is the same as the elevation and index apparatus of a water hydraulic driven type of FIG. 1. The elevation and index mechanism consists of a roller gear cam 45 with an appropriate cam curve formed on a generally cylindrical cam, and a plurality of roller followers 47 corresponding to index intervals engageable with the roller gear cam 45 upon application of pressurization The input shaft of the roller gear cam 45 is connected to the output shaft of a water hydraulic motor 41 through a bevel gear 44, and a limit switch 46 is mounted on the side opposite to the input shaft of the roller gear cam 45. The cam curve of the roller gear cam 45 is configured such that it rotates the roller followers 47 at three quarters of one rotation of the cam, and no power is applied to the roller follower 47 during the remaining one-quarter of the one rotation. This can exclude an impact of a backlash of the bevel gear 44. Further, the limit switch 46 can be set such that a signal is issued at one location upon every one rotation.

The water hydraulic motor 41 is a water hydraulic motor of the type that is integral with a water-lubricating reduction device, and it is not built-in with a sensor. The speed of the water hydraulic motor 41 can be adjusted by adjusting an opening of a water hydraulic throttle valve 43, and the timing of operation can be adjusted by shifting a water hydraulic directional control valve 42 in response to the start-up signal and a signal from the limit switch 46. The configuration of the mechanism itself can be made more simple by using the roller gear cam 45 and the roller followers 47 instead of the configuration of the mechanism as shown in FIG. 1, yet somewhat larger in size due to the mechanical restrictions.

The driving of the elevation and index table in the direction of elevation can also be adjusted in such a manner that the speed is adjusted by the water hydraulic valve 43, and the timing of operation is adjusted by the water hydraulic directional control valve 42. Used as the water hydraulic cylinder 40 is so-called cushion cylinder which can automatically reduce the speed in the vicinity of the terminal end point of the stroke, and which is not built-in with a sensor.

The identical configuration can be realized by incorporating a manufactured roller gear cam mechanism only; however, an unnecessary bearing, casing, and other parts are also incorporated together thereby making the resulting system larger in size, so that it is desired to incorporate such a water hydraulic motor into the elevation and index mechanism from the point of view of making the system smaller in size. As compared with the mechanism as shown in FIG. 1, the mechanism in this embodiment of the present invention provides merits and advantages in that the structure can be made more simplified and the mechanism can improve precision and reduce costs of manufacturing, if the index angle and the elevating distance are restricted. However, it suffers from disadvantages in that the assembly and adjustment become more difficult, and the mechanism itself has to be rebuilt if the index angle or the elevating distance is changed.

The elevation and index apparatus of a water hydraulic driven type in this embodiment of the present invention can simplify the configuration of the electrical devices and parts, and contribute to a decrease in costs of manufacturing because the water hydraulic cylinder 40, the water hydraulic directional control valve 42 for adjusting the operation of the water hydraulic motor 41, and the water hydraulic throttle valve 43 do not require a servo controller, a sensor amplifier, and so on.

Therefore, the elevation and index apparatus of a water hydraulic driven type of the configuration as shown in FIG. 1 is particularly effective for a soft function of operation by the servo mechanism, while the elevation and index apparatus of a water hydraulic driven type of the configuration as shown in FIGS. 3(a) and 3(b) is particularly effective for a configuration that requires a low-cost and simple configuration with regard to restricted elevation and index operation. Therefore, the elevation and index apparatus of a water hydraulic driven type according to the present invention is particularly effective by selecting an appropriate elevation and index apparatus so as to adapt to its usage.

EFFECTS OF THE INVENTION

The present invention can provide advantages in that the elevation and index apparatus of a water hydraulic driven type can realize a compact yet large elevation stroke, as compared with an elevation and index apparatus of the configuration in which an elevation table is disposed on a rotary table, because the rotary table has a communicating bore formed in its center and the elevation and index table is held by a main elevation shaft extending through the communicating bore.

The present invention can further provide an advantage in that pollution of the surroundings resulting from leakage of driving medium, or an occurrence of short circuiting due to such leakage can be prevented by using a cylinder and a motor, each of a water hydraulic driven type, and a water hydraulic control valve for controlling operation of the elevation and index apparatus.

Furthermore, the present invention can provide an advantage in that the configuration of the apparatus can be-prepared readily with-a higher degree of freedom and made more compact in size because the problem which would otherwise result from using water as a driving medium is not necessarily taken into account and no mechanism for protection from washing water is installed, since a water hydraulic actuator utilizing water is made of a rustproof material. Further, the elevation and index apparatus of a water hydraulic driven type according to the present invention can realize an output and responsiveness as high as an oil hydraulic elevation and index apparatus, because it is driven likewise by liquid pressure.

Moreover, the present invention can provide an advantage in that an occurrence of critical failures and a reduction in the life of the apparatus can be prevented by the provision of a casing enclosing the power transmission mechanism, even if a small amount of water would penetrate into the mechanism. This is so because, a majority of the parts and devices of the elevation and index apparatus of a water hydraulic driven type is composed mainly of parts and devices of simplified function. The casing can further prevent the mechanism portion requiring lubrication from being exposed directly to washing water, and provide increased speed of performance and reliability.

Another feature of the present invention resides in that the total size of the apparatus can be made smaller, the capacity of the motor drivable by the reduction device can be reduced, and the elevation and index table can be aligned at a desired level of precision by using a gear deceleration mechanism consisting of a combination of gears as a power transmission mechanism, even if the positioning accuracy of the motors would be relatively low. With this configuration, an impact of the backlash upon the elevation and index table can be controlled by slightly rotating the rotary table by means of a biasing force, when the position of the elevation and index table would be deviated on account of the working reaction force resulting from the backlash occurring in the engaging sections of the gears, even if the water hydraulic motor for example would be aligned to the desired position, or when an error in positioning of the rotary table would be caused to occur due to the backlash.

Further, the present invention is provided with an additional feature in that the possibility of causing failures in the sensors can be reduced, and the reliability of the power transmission mechanism as a whole can be achieved by installing the sensors within the motor drivable by water pressure or the water hydraulic cylinder. The sensors are likely to cause failures due to penetration of washing water or impact force upon spraying the apparatus with washing water.

Moreover, the present invention is provided with other features in that an absolute position of the rotary table can be detected, which is needed for positioning with a processing tool, and an actual position of the rotary table can be detected without undergoing the influences of a backlash resulting from the reduction mechanism. In this configuration, locating the sensor for use in detecting the position of the table within the casing does not require a sensor with a special waterproof treatment.

Furthermore, another feature of the present invention resides in that a predetermined positioning accuracy can be achieved relatively easily by a sensor having a relatively low precision by using two sensors and shifting the two sensors.

In addition, the present invention is provided with an additional feature in that high indexing accuracy can be realized by lower positioning accuracy than in the case of using the reduction gear deceleration mechanism, simply by using a concave globoidal cam and roller cam follower for the power transmission mechanism, without undergoing an impact of a backlash. Although a space is sacrificed to some extent.

Further, the present invention is provided with another feature in that, by using the water hydraulic motor with a built-in reduction device, the motor can be positioned without using a sensor of high precision and a desired accuracy can be obtained by a simplified ON-OFF action of the water hydraulic control valve because the cylinder is simply transferred up to the position at which the stroke abuts with the terminal.

What is claimed is:

1. An elevation and index apparatus for elevating and indexing an object located thereon, comprising:
    a rotary table rotatably supported by a bearing, said rotary table including a communicating bore through a center thereof;
    a power transmission mechanism for rotating said rotary table;
    a motor fixed to a table base which supports said bearing, said motor including an output shaft that is connected to said power transmission mechanism;
    a cylinder including an output shaft disposed to move linearly through said table base;
    a main elevation shaft extending through said communicating bore and connected to said output shaft;
    an elevation and index table connected to said main elevation shaft, and also connected to said rotary table so as to be moveable upwardly or downwardly relative to said rotary table while being restricted in rotational movement relative to said rotary table; and
    a casing disposed outside of said table base and enclosing said power transmission mechanism,
    wherein said motor and said cylinder are each driveable by water pressure, and said motor and said cylinder are each controllable by a water hydraulic control valve.

2. The elevation and index apparatus according to claim 1, wherein said power transmission mechanism includes a follower node fixed to said rotary table and a drive node engageable with said follower node.

3. The elevation and index apparatus according to claim 2, wherein said output shaft is disposed to move linearly through said table base by being disposed to move linearly along a rotational center of said follower node.

4. The elevation and index apparatus according to claim 3, wherein said elevation and index table is connected to said rotary table so as to be moveable upwardly or downwardly relative to said rotary table while being restricted in rotational movement relative to said rotary table by being connected to said rotary table via a shaft.

5. The elevation and index apparatus according to claim 4, wherein said power transmission mechanism comprises a gear reduction mechanism.

6. The elevation and index apparatus according to claim 5, wherein said motor comprises a water hydraulic motor with a built-in sensor and a reduction mechanism.

7. The elevation and index apparatus according to claim 6, wherein said cylinder comprises a water hydraulic cylinder with a built-in sensor.

8. The elevation and index apparatus according to claim 7, further comprising:
    a rotary position sensor for sensing a rotary position of said rotary table, said rotary position sensor being disposed within said casing.

9. The elevation and index apparatus according to claim 8, further comprising a control unit that is to control said motor so as to follow a target pass calculated in advance on the basis of a signal from said sensor that is built in said motor at a point in time when alignment 6f said rotary table begins, and that is also to control said motor on the basis of a signal from said rotary position sensor at a point in time when the target pass reaches a target position.

10. The elevation and index apparatus according to claim 1, wherein said power transmission mechanism comprises a combination of a roller gear and a roller cam follower.

11. The elevation and index apparatus according to claim 10, wherein said motor is driveable by water pressure and is integrally provided with a reduction device.

12. The elevation and index apparatus according to claim 11, wherein said cylinder is driveable by water pressure and has a built-in mechanism that is to decelerate a speed of said cylinder at a terminal end of a stroke of said cylinder.

13. The elevation and index apparatus according to claim 1, further comprising:

a rotary position sensor for sensing a rotary position of said rotary table, said rotary position sensor being disposed within said casing.

14. The elevation and index apparatus according to claim 13, further comprising a control unit that is to control said motor so as to follow a target pass calculated in advance on the basis of a signal from said sensor that is built in said motor at a point in time when alignment of said rotary table begins, and that is also to control said motor on the basis of a signal from said rotary position sensor at a point in time when the target pass reaches a target position.

15. The elevation and index apparatus according to claim 1, wherein said cylinder comprises a water hydraulic cylinder with a built-in sensor.

16. The elevation and index apparatus according to claim 1, wherein said cylinder is driveable by water pressure and has a built-in mechanism that is to decelerate a speed of said cylinder at a terminal end of a stroke of said cylinder.

17. The elevation and index apparatus according to claim 1, wherein said motor comprises a water hydraulic motor-with a built-in sensor and a reduction mechanism.

18. The elevation and index apparatus according to claim 1, wherein said motor is driveable by water pressure and is integrally provided with a reduction device.

19. The elevation and index apparatus according to claim 1, wherein said power transmission mechanism comprises a gear reduction mechanism.

20. The elevation and index apparatus according to claim 1, wherein said elevation and index table is rotatably and axially moveable relative to said table base.

* * * * *

UNITED STATES PATENT AND TRADEMARK OFFICE
CERTIFICATE OF CORRECTION

PATENT NO.   : 6,453,773 B1
DATED        : September 24, 2002
INVENTOR(S)  : Yoshihiro Mochizuki et al.

It is certified that error appears in the above-identified patent and that said Letters Patent is hereby corrected as shown below:

<u>Title page,</u>
Item [75], change the fifth inventor's name change from "JPX Mammoto" to
-- Shinzo Mammoto --.

Signed and Sealed this

Thirty-first Day of December, 2002

JAMES E. ROGAN
*Director of the United States Patent and Trademark Office*